(12) United States Patent
Hanson et al.

(10) Patent No.: US 9,141,015 B2
(45) Date of Patent: Sep. 22, 2015

(54) ELECTROPHOTOGRAPHY-BASED ADDITIVE MANUFACTURING SYSTEM WITH TRANSFER-MEDIUM SERVICE LOOPS

(71) Applicant: Stratasys, Inc., Eden Prairie, MN (US)

(72) Inventors: William J. Hanson, Carlsbad, CA (US); J. Randolph Sanders, Rancho Santa Fe, CA (US); Michael W. Bacus, Temecula, CA (US); Steven A. Chillscyzn, Victoria, MN (US)

(73) Assignee: Stratasys, Inc., Eden Prairie, MN (US)

( * ) Notice: Subject to any disclaimer, the term of this patent is extended or adjusted under 35 U.S.C. 154(b) by 0 days.

(21) Appl. No.: 13/912,489

(22) Filed: Jun. 7, 2013

(65) Prior Publication Data
US 2013/0272746 A1 Oct. 17, 2013

Related U.S. Application Data

(63) Continuation of application No. 13/242,841, filed on Sep. 23, 2011, now Pat. No. 8,488,994.

(51) Int. Cl.
*G03G 15/22* (2006.01)
*G03G 13/00* (2006.01)
*G03G 15/00* (2006.01)

(52) U.S. Cl.
CPC .............. *G03G 13/00* (2013.01); *G03G 15/00* (2013.01); *G03G 15/225* (2013.01)

(58) Field of Classification Search
USPC .......... 399/130, 133, 139, 166, 411; 264/113, 264/463, 497; 427/256
See application file for complete search history.

(56) References Cited

U.S. PATENT DOCUMENTS 2,297,691 A 10/1942 Carlson
4,988,602 A 1/1991 Jongewaard et al.
(Continued)

FOREIGN PATENT DOCUMENTS

CN 101310964 11/2008
EP 0712051 5/1996
(Continued)

OTHER PUBLICATIONS

International Search Report and Written Opinion dated Jan. 30, 2013 from International Patent Application No. PCT/US2012/056599.
(Continued)

*Primary Examiner* — Hoan Tran
(74) *Attorney, Agent, or Firm* — Westman, Champlin & Koehler, P.A.

(57) ABSTRACT

An additive manufacturing system for printing a three-dimensional part using electrophotography, the additive manufacturing system including a rotatable photoconductor component, a development station configured to develop layers of a material on a surface of the rotatable photoconductor component, a rotatable transfer medium configured to receive the developed layers from the surface of the rotatable photoconductor component, and a platen configured to receive the developed layers from the rotatable transfer medium in a layer-by-layer manner. The additive manufacturing system also includes a plurality of service loops configured to move portions of the rotatable transfer medium at different line speeds while maintaining a net rotational rate of full rotations of the rotatable transfer medium at a substantially steady state.

20 Claims, 8 Drawing Sheets

(56) References Cited

U.S. PATENT DOCUMENTS

| | | |
|---|---|---|
| 5,088,047 A | 2/1992 | Bynum |
| 5,099,288 A | 3/1992 | Britto et al. |
| 5,254,421 A | 10/1993 | Coppens et al. |
| 5,354,414 A | 10/1994 | Feygin |
| 5,514,232 A | 5/1996 | Burns |
| 5,593,531 A | 1/1997 | Penn |
| 5,594,652 A | 1/1997 | Penn et al. |
| 5,866,058 A | 2/1999 | Batchelder et al. |
| 5,981,616 A | 11/1999 | Yamamura et al. |
| 5,990,268 A | 11/1999 | Dickens, Jr. et al. |
| 6,052,551 A | 4/2000 | De Cock et al. |
| 6,066,285 A | 5/2000 | Kumar |
| 6,169,605 B1 | 1/2001 | Penn et al. |
| 6,206,672 B1 | 3/2001 | Grenda |
| 6,329,115 B1 | 12/2001 | Yamashita |
| 6,376,148 B1 | 4/2002 | Liu et al. |
| 6,509,128 B1 | 1/2003 | Everaerts et al. |
| 6,531,086 B1 | 3/2003 | Larsson |
| 6,708,012 B2 | 3/2004 | Misaizu et al. |
| 6,756,174 B2 | 6/2004 | Van Vechten et al. |
| 6,780,368 B2 | 8/2004 | Liu et al. |
| 6,799,959 B1 | 10/2004 | Tochimoto et al. |
| 6,815,636 B2 | 11/2004 | Chung et al. |
| 6,887,640 B2 | 5/2005 | Zhang et al. |
| 6,993,269 B2 | 1/2006 | Yamauchi et al. |
| 7,011,783 B2 | 3/2006 | Fong |
| 7,077,638 B2 | 7/2006 | Leyden et al. |
| 7,208,257 B2 | 4/2007 | Cheng et al. |
| 7,261,541 B2 | 8/2007 | Fong |
| 7,261,542 B2 | 8/2007 | Hickerson et al. |
| 7,291,242 B2 | 11/2007 | Khoshnevis |
| 7,435,763 B2 | 10/2008 | Farr et al. |
| 7,815,826 B2 | 10/2010 | Serdy et al. |
| 7,988,906 B2 | 8/2011 | Monsheimer et al. |
| 8,047,251 B2 | 11/2011 | Khoshnevis |
| 8,119,053 B1 | 2/2012 | Bedal et al. |
| 8,124,192 B2 | 2/2012 | Paasche et al. |
| 8,147,910 B2 | 4/2012 | Kritchman |
| 8,173,258 B2 | 5/2012 | Monsheimer et al. |
| 8,216,757 B2 | 7/2012 | Mizutani et al. |
| 8,221,671 B2 | 7/2012 | Hull et al. |
| 8,249,480 B2 | 8/2012 | Aslam et al. |
| 8,276,511 B2 * | 10/2012 | Raksha et al. ........ 101/375 |
| 2002/0093115 A1 | 7/2002 | Jang et al. |
| 2002/0145213 A1 | 10/2002 | Liu et al. |
| 2004/0232583 A1 | 11/2004 | Monsheimer et al. |
| 2005/0207801 A1 | 9/2005 | Kunii et al. |
| 2005/0218549 A1 | 10/2005 | Farr et al. |
| 2008/0032083 A1 | 2/2008 | Serdy et al. |
| 2008/0169589 A1 | 7/2008 | Sperry et al. |
| 2008/0171284 A1 | 7/2008 | Hull et al. |
| 2008/0226346 A1 | 9/2008 | Hull et al. |
| 2009/0236775 A1 | 9/2009 | Monsheimer et al. |
| 2011/0117485 A1 | 5/2011 | Hermann et al. |
| 2012/0041132 A1 | 2/2012 | Monsheimer et al. |
| 2012/0139167 A1 | 6/2012 | Fruth et al. |
| 2012/0201960 A1 | 8/2012 | Hartmann et al. |
| 2012/0202012 A1 | 8/2012 | Grebe et al. |
| 2012/0237870 A1 | 9/2012 | Watanabe et al. |
| 2012/0263488 A1 | 10/2012 | Aslam et al. |
| 2012/0274002 A1 | 11/2012 | Uchida |
| 2013/0171434 A1 | 7/2013 | Hirth et al. |

FOREIGN PATENT DOCUMENTS

| | | |
|---|---|---|
| GB | 2446386 | 8/2008 |
| JP | 5165350 | 7/1993 |
| JP | 8281808 | 10/1996 |
| JP | 2001075376 | 3/2001 |
| JP | 2002347129 | 12/2002 |
| JP | 2003053849 | 2/2003 |
| JP | 2003071940 | 3/2003 |
| JP | 2005062860 | 3/2005 |
| JP | 2006182813 | 7/2006 |
| WO | 9851464 | 11/1998 |
| WO | 2004037469 | 5/2004 |
| WO | 2007114895 | 10/2007 |
| WO | 2011065920 | 6/2011 |
| WO | 2012/034666 A1 | 3/2012 |

OTHER PUBLICATIONS

Jones, Jason, "Selective Laser Printing", Published prior to Jan. 14, 2013, 1 page.

"Xerography", Aug. 27, 2010, pp. 1-4, http:/en.wikipedia.org/wiki/Xerography.

* cited by examiner

ELECTROPHOTOGRAPHY-BASED ADDITIVE MANUFACTURING SYSTEM WITH TRANSFER-MEDIUM SERVICE LOOPS

CROSS-REFERENCE TO RELATED APPLICATION(S)

This application is a continuation of and claims priority to U.S. application Ser. No. 13/242,841, filed on Sep. 23, 2011, and entitled "ELECTROPHOTOGRAPHY-BASED ADDITIVE MANUFACTURING SYSTEM WITH TRANSFER-MEDIUM SERVICE LOOPS", the disclosure of which is incorporated by reference in its entirety.

BACKGROUND

The present disclosure relates to additive manufacturing systems for building three-dimensional (3D) parts and support structures. In particular, the present disclosure relates to systems and processes for building 3D parts and support structures with electrophotography-based systems.

Additive manufacturing systems are used to build 3D parts from digital representations of the 3D parts (e.g., STL format files) using one or more additive manufacturing techniques. Examples of commercially available additive manufacturing techniques include extrusion-based techniques, ink jetting, selective laser sintering, powder/binder jetting, electron-beam melting, and stereolithographic processes. For each of these techniques, the digital representation of the 3D part is initially sliced into multiple horizontal layers. For each sliced layer, a tool path is then generated, which provides instructions for the particular additive manufacturing system to form the given layer.

For example, in an extrusion-based additive manufacturing system, a 3D part or model may be printed from a digital representation of the 3D part in a layer-by-layer manner by extruding a flowable part material. The part material is extruded through an extrusion tip carried by a print head of the system, and is deposited as a sequence of roads on a substrate in an x-y plane. The extruded part material fuses to previously deposited part material, and solidifies upon a drop in temperature. The position of the print head relative to the substrate is then incremented along a z-axis (perpendicular to the x-y plane), and the process is then repeated to form a 3D part resembling the digital representation.

In fabricating 3D parts by depositing layers of a part material, supporting layers or structures are typically built underneath overhanging portions or in cavities of objects under construction, which are not supported by the part material itself. A support structure may be built utilizing the same deposition techniques by which the part material is deposited. The host computer generates additional geometry acting as a support structure for the overhanging or free-space segments of the 3D part being formed. Support material is then deposited from a second nozzle pursuant to the generated geometry during the printing process. The support material adheres to the modeling material during fabrication, and is removable from the completed 3D part when the printing process is complete.

In two-dimensional (2D) printing, electrophotography (i.e., xerography) is a popular technology for creating 2D images on planar substrates, such as printing paper. Electrophotography systems include a conductive support drum coated with a photoconductive material, where latent electrostatic images are formed by uniformly charging and then image-wise exposing the photoconductive layer by an optical source. The latent electrostatic images are then moved to a developing station where toner is applied to charged areas of the photoconductive insulator to form visible images. The formed toner images are then transferred to substrates (e.g., printing paper) and affixed to the substrates with heat or pressure.

SUMMARY

An aspect of the present disclosure is directed to an additive manufacturing system for printing a 3D part using electrophotography. The system includes a rotatable photoconductor component having a surface, and a development station, where the development station is configured to develop layers of a material on the surface of the rotatable photoconductor component. The system also includes a rotatable transfer medium configured to receive the developed layers from the surface of the rotatable photoconductor component, and a platen configured to receive the developed layers from the rotatable transfer component in a layer-by-layer manner to print the 3D part from at least a portion of the received layers. The system further includes a plurality of service loops configured to move portions of the rotatable transfer medium at different line speeds while maintaining a net rotational rate of full rotations of the rotatable transfer medium at a substantially steady state.

Another aspect of the present disclosure is directed to an additive manufacturing system for printing a 3D part using electrophotography, where the system includes a rotatable photoconductor component having a surface configured to receive layers of at least one material using electrophotography. The system also includes a rotatable transfer medium configured to travel through a first region to receive the developed layers from the rotatable photoconductor component, and further configured to travel through a second region to transfer the received developed layers. The system further includes a platen configured to receive the transferred layers from the rotatable transfer medium in the second region in a layer-by-layer manner to print the 3D part from at least a portion of the received layers. The system further includes a plurality of service loops configured to move a first portion of the rotatable transfer medium through the first region at a constant rate line speed, and further configured to move a second portion of the rotatable transfer medium through the second region at an intermittent line speed.

Another aspect of the present disclosure is directed to a method for printing a 3D part. The method includes rotating a transfer medium such that a first portion of the transfer medium in a first region moves at a first line speed, and such that a second portion of the transfer medium moves at a second line speed that is different from the first line speed. The method also includes rotating a photoconductor component at a rate that is synchronized with the first line speed, and developing layers of the 3D part from a development station onto a surface of the rotating photoconductor component while the photoconductor component is rotating. The method also includes transferring the developed layers from the rotating photoconductor component to the rotating transfer medium in the first region, and transferring the developed layers from the rotating transfer medium to a platen in the second region.

DETAILED DESCRIPTION

The present disclosure is directed to an additive manufacturing system for printing 3D parts and support structures using electrophotography. As discussed below, the system prints the 3D parts and support structures in a layer-by-layer manner with the use of a photoconductor, a transfer medium, and a platen, where the transfer medium (e.g., a transfer belt) includes at least two service loops that allow different portions of the transfer medium to operate at different line speeds. For example, a first portion of the transfer medium may be moved at a constant rate and a second portion of the transfer medium may be moved at an intermittent rate (i.e., intermittent starting and pausing). This increases the printing efficiency of the system, thereby reducing operating times while printing 3D parts and support structures.

Figure 1:
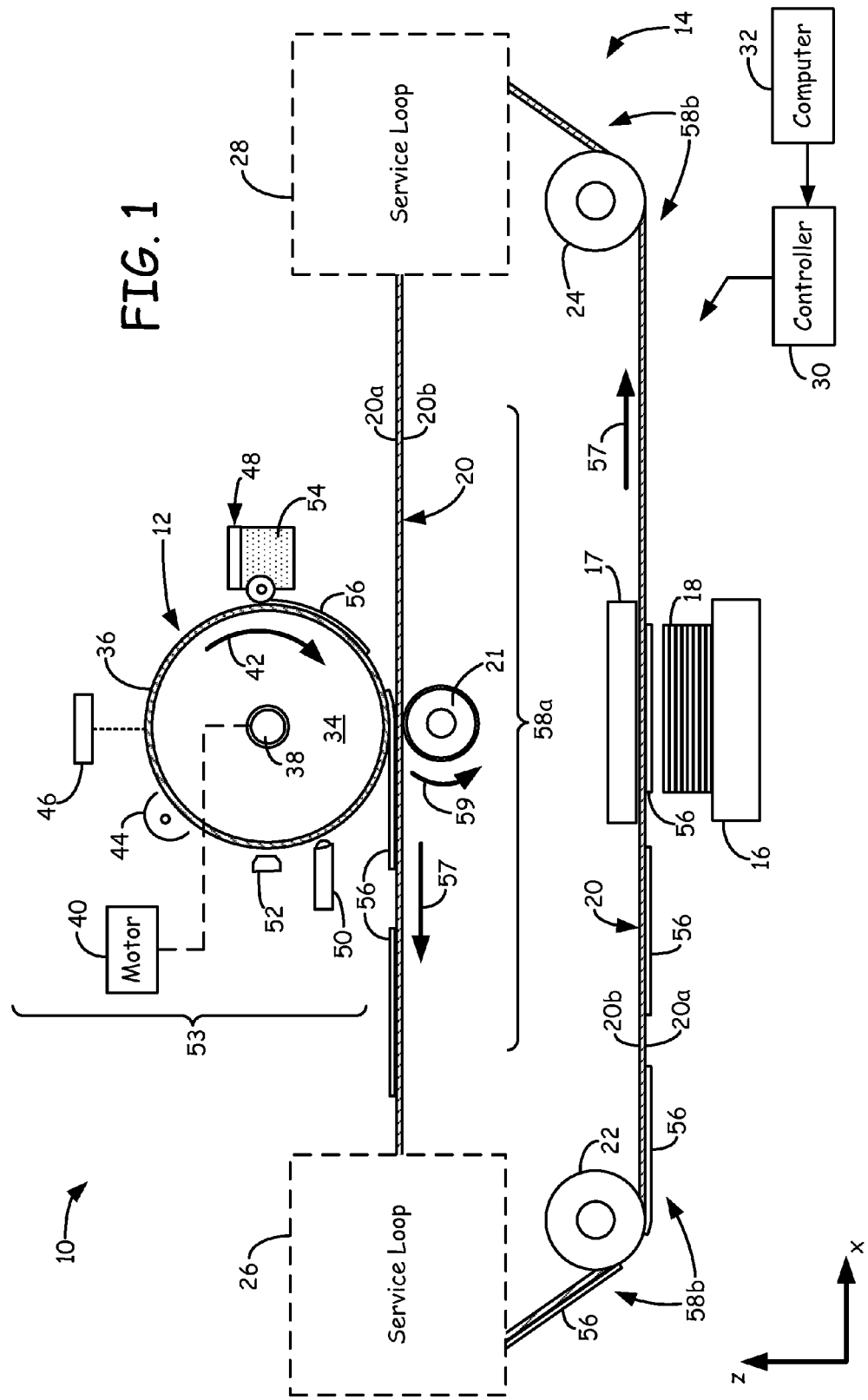
FIG. 1 is a schematic illustration of an additive manufacturing system of the present disclosure for printing 3D parts using electrophotography, where the system includes transfer belt assembly with two service loops.

As shown in FIG. 1, system 10 includes photoconductor drum 12, transfer belt assembly 14, platen 16, and transfusion plate 17 for printing 3D parts (e.g., 3D part 18). Transfer belt assembly 14 includes transfer belt 20, biased roller 21, tension rollers 22 and 24, and service loops 26 and 28. As discussed below, service loops 26 and 28 are configured to move a first portion of transfer belt 20, located between service loops 26 and 28 and engaged with photoconductor drum 12 and biased roller 21, at a first constant rate line speed. Additionally, service loops 26 and 28 are also configured to move a second portion of transfer belt 20, located between service loops 26 and 28 and engaged with platen 16 and transfusion plate 17, at a second intermittent line speed. However, the net rotational rate of the full rotations of transfer belt 20 may be maintained at a substantially steady state.

System 10 also includes controller 30, which is one or more microprocessor-based engine control systems and/or digitally-controlled raster imaging processor systems, and which is configured to operate the components of system 10 in a synchronized manner based on printing instructions received from host computer 32. Host computer 32 is one or more computer-based systems configured to communicate with controller 30 to provide the print instructions (and other operating information). For example, host computer 32 may transfer information to controller 30 that relates to the sliced layers of 3D part 18 (and any support structures), thereby allowing system 10 to print 3D part 18 in a layer-by-layer manner.

The components of system 10 are desirably retained within an enclosable housing (not shown) that prevents ambient light from being transmitted to the components of system 10 during operation. While described herein as a drum, photoconductor drum 12 may alternatively be a roller, a belt assembly, or other rotatable assembly.

Photoconductor drum 12 includes conductive drum 34 and photoconductive surface 36, where conductive drum 34 is an electrically-conductive drum (e.g., fabricated from copper, aluminum, tin, or the like) that is electrically grounded and configured to rotate around shaft 38. Shaft 38 is correspondingly connected to drive motor 40, which is configured to rotate shaft 38 (and photoconductor drum 12) in the direction of arrow 42 at a constant rate.

Photoconductive surface 36 is a thin film extending around the circumferential surface of conductive drum 34, and is derived from one or more photoconductive materials, such as amorphous silicon, selenium, zinc oxide, organic materials, and the like. As discussed below, surface 36 is configured to receive latent-charged images of the sliced layers of 3D part 18 (or negative images), and to attract charged particles of the part material to the charged or discharged image areas, thereby creating the layers of 3D part 18.

As further shown, system 10 also includes charge inducer 44, imager 46, development station 48, cleaning station 50, and discharge device 52, each of which may be in signal communication with controller 30. Photoconductor drum 12 along with charge inducer 44, imager 46, development station 48, cleaning station 50, and discharge device 52 define electrophotography (EP) engine 53 for system 10. Charge inducer 44, imager 46, development station 48, cleaning station 50, and discharge device 52 of EP engine 53 accordingly define an image-forming assembly for surface 36 while drive motor 40 and shaft 38 rotate photoconductor drum 12 in the direction of arrow 42. In the shown example, the image-forming assembly for surface 36 is used to form a layer of a part material 54 for printing 3D part 18, where a supply of part material 54 is retained by development station 48.

Charge inducer 44 is configured to generate a uniform electrostatic charge on surface 36 as surface 36 rotates in the direction of arrow 42 past charge inducer 44. Suitable devices for charge inducer 44 include corotrons, scorotrons, charging rollers, and other electrostatic charging devices.

Imager 46 is a digitally-controlled, pixel-wise light exposure apparatus configured to selectively emit electromagnetic radiation toward the uniform electrostatic charge on surface 36 as surface 36 rotates in the direction of arrow 42 past imager 46. The selective exposure of the electromagnetic radiation to surface 36 is directed by controller 30, and causes discrete pixel-wise locations of the electrostatic charge to be removed (i.e., discharged to ground), thereby forming latent image charge patterns on surface 36. Suitable devices for imager 46 include scanning laser (e.g., gas or solid state lasers) light sources, light emitting diode (LED) array exposure devices, and other exposure device conventionally used in 2D electrophotography systems. In alternative embodiments, suitable devices for imager 32 and charge inducer 44 include ion-deposition systems configured to selectively directly deposit charged ions or electrons to surface 24 to form the latent image charge pattern. As such, as used herein, the term "electrophotography" includes ionography.

Development station 48 is an electrostatic and magnetic development station that retains the supply of part material 54 (or other suitable material) in powder form, and that applies part material 54 to surface 36. In particular, as surface 36

(containing the latent charged image) rotates from imager 46 to development station 48 in the direction of arrow 42, part material 54 is attracted to the appropriately charged regions of the latent image on surface 36, utilizing either charged area development or discharged area development (depending on the electrophotography mode being utilized). This creates successive layers 56 of part material 54 as photoconductor drum 12 continues to rotate in the direction of arrow 42, where the successive layers 56 correspond to the successive sliced layers of the digital representation of 3D part 18.

Development station 48 may function in a similar manner to single or dual component development systems and toner cartridges used in 2D electrophotography systems. For example, development station 48 may include an enclosure for retaining the charged part material 54, and one or more devices for transferring the charged part material 54 to surface 36, such as conveyor, fur brushes, paddle wheels, rollers, and/or magnetic brushes. Suitable materials for part material 54 may vary depending on the desired part properties, such as one or more thermoplastic resins. Examples of suitable thermoplastic resins for part material 54 include polyolefins, polyester, nylon, toner materials (e.g., styrene-acrylate/acrylic materials), and combinations thereof. In dual-component arrangements, part material 54 may also include a carrier material with the thermoplastic resin(s). For example, the carrier material may be coated with an appropriate material to triboelectrically charge the thermoplastic resin(s) of part material 54. In an alternative example, the carrier material may be coated with the thermoplastic resin(s) of support material 46.

The successive layers 56 of part material 54 are then rotated with surface 36 in the direction of arrow 42 to a transfer region in which layer 56 are successively transferred from photoconductor drum 12 to transfer belt 20 of transfer belt assembly 14, as discussed below. After a given layer 56 is transferred from photoconductor drum 12 to transfer belt 20, drive motor 40 and shaft 38 continue to rotate photoconductor drum 12 in the direction of arrow 42 such that the region of surface 36 that previously held the layer 56 passes cleaning station 50. Cleaning station 50 is a station configured to remove any residual, non-transferred portions of part material 54. Suitable devices for cleaning station 50 include blade cleaners, brush cleaners, electrostatic cleaners, vacuum-based cleaners, and combinations thereof.

After passing cleaning station 50, surface 36 is then rotated in the direction of arrow 42 such that the cleaned regions of surface 36 pass discharge device 52 to remove any residual electrostatic charge on surface 36, prior to starting the next cycle. Suitable devices for discharge device 52 include optical systems, high-voltage alternating-current corotrons and/or scorotrons, one or more rotating dielectric rollers having conductive cores with applied high-voltage alternating-current, and combinations thereof.

Transfer belt 20 of transfer belt assembly 14 is a transfer medium for transferring the developed successive layers 56 from photoconductor drum 12 to platen 16 with the assistance of transfusion plate 17. Transfer belt 20 is an electrically semi-conductive belt that includes front surface 20a and rear surface 20b, where front surface 20a faces surface 24 of photoconductor drum 12 and rear surface 20b is in contact with biased roller 21.

In some embodiments, belt 20 may be a multi-layer belt with a low-surface-energy film that defines front surface 20a, and which is disposed over an electrically semi-conductive base portion. As such, front surface 20a may include a layer (e.g., film) of one or more low-surface energy materials to effectively transfer the received layers of part material 54 to platen 16. Examples of suitable materials for front surface 20a include fluorinated polymers, such as polytetrafluoroethylenes (PTFE), fluorinated ethylene propylenes, and perfluoroalkoxy polymers. Examples of suitable commercially available fluorinated polymers include PTFE available under the trade designation "TEFLON" from E.I. du Pont de Nemours and Company, Wilmington, Del.

Biased roller 21 is a roller that is electrically biased with a potential having a magnitude and sign that electrostatically attracts the layers of part material 56 from surface 24 of photoconductor drum 12 to transfer belt 20 at the transfer region. Accordingly, the remaining components of transfer belt assembly 14 desirably electrically insulate and/or isolate transfer belt 20, thereby allowing transfer belt 20 to maintain the electrostatic charge coupling between the transferred material and belt 20 while rotating.

Tension rollers 22 and 24 are a pair of idler rollers or pulleys that are configured to maintain tension on transfer belt 20 while transfer belt 20 rotates in the rotational direction of arrows 57 from service loop 26, past platen 16 and transfusion plate 17, and to service loop 28. This allows transfer belt 20 to maintain a substantially planar orientation when engaging platen 16 and transfusion plate 17. Transfer belt assembly 14 may also include additional tension rollers along transfer belt 20 to further assist in maintaining tension.

Tension roller 22 and the rollers of service loop 26 (not shown in FIG. 1) desirably have diameters that are great enough such that the successive layers 56 retained by transfer belt 20 are not distorted or otherwise damaged when traveling around the given rollers. In other words, the angle of curvature around tension roller 22 and the rollers of service loop 26 desirably do not distort the dimensions of layers 56 as layers 56 and transfer belt 20 wind around the given rollers. As discussed below, in some embodiments, system 10 may be arranged to minimize or otherwise reduce the angle of curvature that transfer belt 20 is required to wind around while retaining layers 56.

During operation, controller 30 directs service loops 26 and 28 to rotate transfer belt 20 in the rotational direction of arrows 57 to transfer successive developed layers 56 from photoconductor drum 12 to platen 16. Controller 30 directs service loops 26 and 28 to rotate transfer belt 20 such that the portion of transfer belt 20 that travels in the region between service loop 28 to service loop 26, and that passes photoconductor drum 12 and biased roller 21 (referred to as upper region 58a), is moved at a first constant rate line speed that is synchronized with the constant rotational rate of photoconductor drum 12 in the direction of arrow 42. This prevents frictional sliding at the transfer region between photoconductor drum 12 and transfer belt 20.

In the shown embodiment, biased roller 21 is an idler roller that rotates in the direction of arrow 59 at a rate that may also be synchronized with the movement of transfer belt 20 in the rotational direction of arrows 57. In alternative embodiments, biased roller 21 may either be actively rotated in the direction of arrow 59 via a drive motor (not shown), or may have a fixed axis (i.e., non-rotating).

Layers 56 are transferred from transfer belt 20 to platen 16 at a second transfer region with the assistance of transfusion plate 17. This operation involves moving one or both of platen 16 and transfusion plate 17 together to press the successive layers 56 from transfer belt 20 to platen 16 (or to the top-most layer of 3D part 18). To accomplish this operation, transfer belt 20 is required to pause during pressing steps. Otherwise, the movement of transfer belt 20 in the rotational direction of arrows 57 during the pressing steps may cause mis-registrations of the pressed layers 56, potentially resulting in lower part quality. Furthermore, the pressing step desirably provides a sufficient duration to allow the pressed layers 56 to adhere to the previously transferred layers of 3D part 18.

Accordingly, controller 30 also directs service loops 26 and 28 to rotate transfer belt 20 such that the portion of transfer belt 20 that travels in the region from service loop 26, around tension roller 22, past engage platen 16 and transfusion plate 17, around tension roller 24, and to service loop 28 (referred to as lower region 58b), is moved at a second intermittent line speed that intermittently pauses during the pressing steps. As such, service loops 26 and 28 move the first portions of transfer belt 20 through upper region 58a at the first constant rate line speed, while simultaneously moving the second portions of transfer belt 20 through lower region 58b at the second intermittent line speed.

As used herein, the term "portion of the transfer medium", such as a first portion of transfer belt 20, a second portion of transfer belt 20, and the like, refer to whatever segment of the transfer medium (e.g., transfer belt 20) that resides in a region at a given point in time while the transfer medium rotates. For example, a portion of transfer belt 20 in upper region 58a refers to whatever segment of transfer belt 20 that happens to be located in upper region 58a at a given point in time while transfer belt 20 rotates. As transfer belt 20 continues to rotate, the portion of transfer belt 20 eventually moves from upper region 58a to lower region 58b. As such, the "portion" of transfer belt 20 is not intended to be limited to a particular segment along transfer belt 20.

Figure 2:
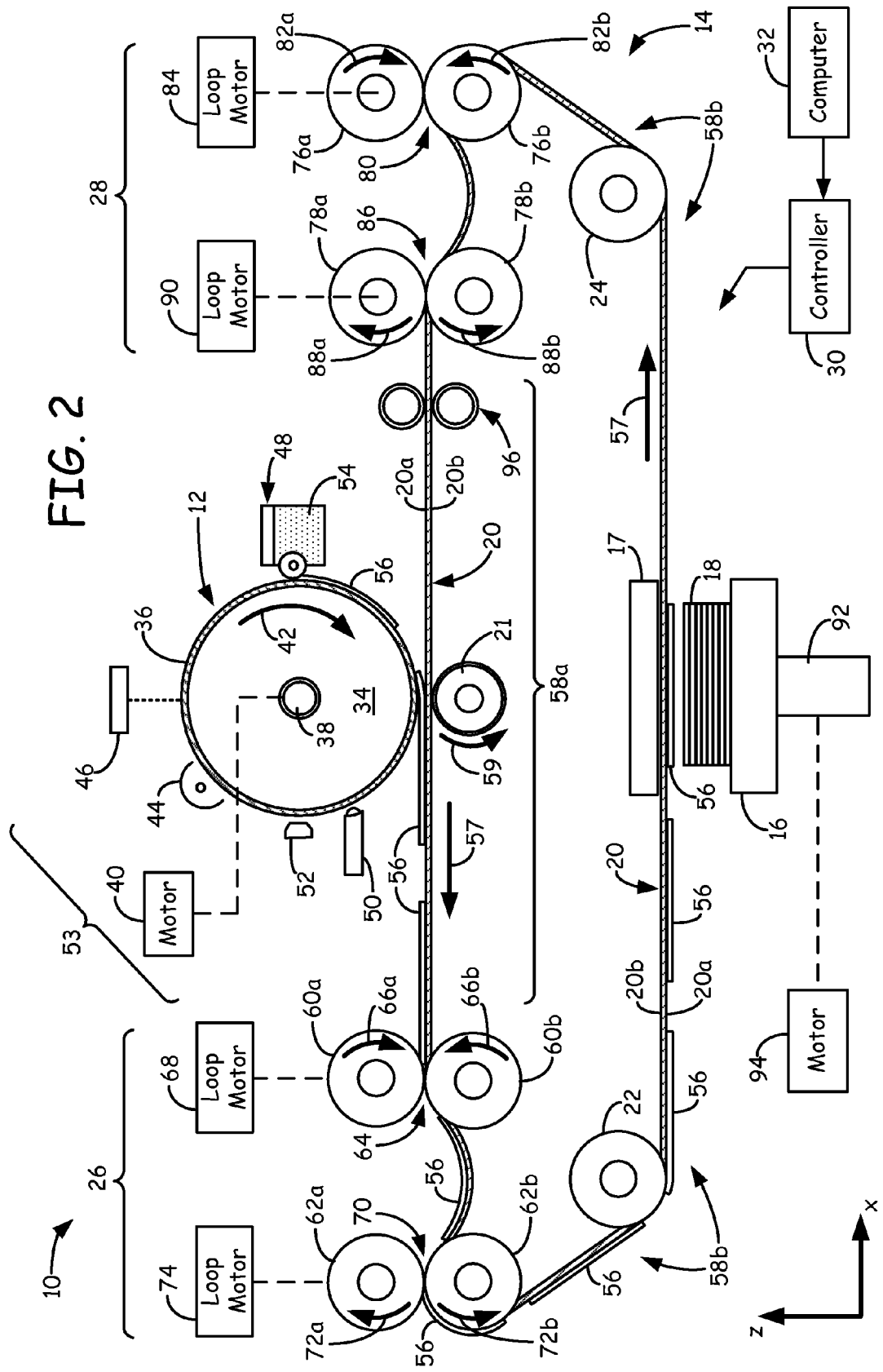
FIG. 2 is a schematic illustration of the additive manufacturing system, depicting a suitable embodiment of the service loops.

FIG. 2 illustrates an example of a suitable embodiment for service loops 26 and 28 in use with system 10. As shown, service loop 26 includes an inlet roller assembly of inlet nip rollers 60a and 60b, and an outlet roller assembly of outlet nip rollers 62a and 62b. Inlet nip rollers 60a and 60b define an inlet nip 64 for receiving transfer belt 20 from photoconductor drum 12 and biased roller 21, where inlet nip rollers 60a and 60b are rotated in the directions of arrows 66a and 66b under the power of loop motor 68, based on commands from controller 30. For example, inlet nip roller 60a may be axially connected to a drive shaft (not shown) that is rotated by loop motor 68, and inlet nip roller 60b may be an idler roller, or vice versa. This arrangement allows inlet nip rollers 60a and 60b to pull transfer belt 20 through upper region 58a at the first constant rate line speed.

Outlet nip rollers 62a and 62b define an outlet nip 70 for receiving transfer belt 20, where outlet nip rollers 62a and 62b are rotated in the directions of arrows 72a and 72b under the power of loop motor 74, based on commands from controller 30. For example, outlet nip roller 62a may be axially connected to a drive shaft (not shown) that is rotated by loop motor 74, and outlet nip roller 62b may be an idler roller, or vice versa. This arrangement allows outlet nip rollers 62a and 62b to pull transfer belt 20 from inlet nip 64 to outlet nip 70 at the second intermittent line speed (i.e., with the intermittent pauses for the pressing steps at platen 16).

Service loop 28 may operate in a similar manner to service loop 26, and includes an inlet roller assembly of inlet nip rollers 76a and 76b, and an outlet roller assembly of outlet nip rollers 78a and 78b. Inlet nip rollers 76a and 76b define an inlet nip 80 for receiving transfer belt 20 from tension roller 24, where inlet nip rollers 76a and 76b are rotated in the directions of arrows 82a and 82b under the power of loop motor 84, based on commands from controller 30. For example, inlet nip roller 78a may be axially connected to a drive shaft (not shown) that is rotated by loop motor 84, and inlet nip roller 78b may be an idler roller, or vice versa. This arrangement allows inlet nip rollers 78a and 78b to pull transfer belt 20 from lower region 58b at the second intermittent line speed (i.e., at the same intermittent rate as outlet nip rollers 72a and 72b of service loop 26).

Outlet nip rollers 78a and 78b define an outlet nip 86 for receiving transfer belt 20, where outlet nip rollers 78a and 78b are rotated in the directions of arrows 88a and 88b under the power of loop motor 90, based on commands from controller 30. For example, outlet nip roller 78a may be axially connected to a drive shaft (not shown) that is rotated by loop motor 90, and outlet nip roller 78b may be an idler roller, or vice versa. This arrangement allows outlet nip rollers 78a and 78b to pull transfer belt 20 from inlet nip 80 to outlet nip 86 at the first constant rate line speed (i.e., at the same constant rate as inlet nip rollers 70a and 70b of service loop 26).

Controller 30 operates loop motors 68 and 90 in coordination with each other to maintain the portion of transfer belt 20 traveling through upper region 58a at the first constant rate line speed, which is desirably synchronized with the rotation of photoconductor drum 12 in the direction of arrow 42. Controller 30 also operates loop motors 74 and 84 in coordination with each other to maintain the portion of transfer belt 20 traveling through lower region 58b at the second intermittent line speed, where the intermittent pauses are synchronized with the pressing steps of platen 16 and transfusion plate 17. As such, controller 30 operates loop motors 68 and 74 of service loop 26 independently of each other, and operates loop motors 84 and 90 of service loop 28 independently of each other.

While transfer belt 20 rotates in the rotational direction of arrows 57, the operations of loop motors 68, 74, 84, and 90 in this manner creates a first moving slacked portion of transfer belt 20 between inlet nip 64 and outlet nip 66 of service loop 26, and a second moving slacked portion of transfer belt 20 between inlet nip 80 and outlet nip 86 of service loop 28. Each of the moving slacked portion service loops of transfer belt 20 lengthens and shortens in a pulsating manner while transfer belt 20 rotates. However, the remaining portions of transfer belt 20 between service loops 26 and 28 have fixed lengths due to the maintained tension (e.g., via tension rollers 22 and 24). As such, the net rotational rate of the full rotations of transfer belt 20 may be maintained at a substantially steady state.

Controller 30 may monitor the line speeds of transfer belt 20 and the rotational rates of inlet nip rollers 60a and 60b, outlet nip rollers 62a and 62b, inlet nip rollers 70a and 70b, and outlet nip rollers 78a and 78b using a variety of different mechanisms, such as rotary encoders (not shown) and/or by the power levels of loop motors 68, 74, 84, and 90. Controller 30 may also incorporate one or more process-control loops to coordinate the operations of drive motor 40 and loop motors 68, 74, 84, and 90, thereby maintaining the steady-state net rotational rate for transfer belt 20.

Platen 16 is a platform assembly of system 10 that is configured to receive the successive layers 56 for printing 3D part 18 in a layer-by-layer manner. Platen 16 is supported by z-axis gantry 92, which is a linear guide mechanism configured to move platen 16 along the vertical z-axis to adjust the elevation of platen 16 relative to transfer belt 20 and transfusion plate 17 during pressing steps. The movement of platen 16 with z-axis gantry 92 is operated by z-axis motor 94 based on commands from controller 30.

Transfusion plate 17 is a planar backing surface configured to support transfer belt 20 while platen 16 is pressed against a given layer 56 and transfer belt 20 during a pressing step. Transfusion plate 17 may also include one or more mechanisms configured to assist in transferring layers 56 from transfer belt 20 to platen 16 (or the top-most surface of 3D part 18). For example, transfixing station 17 may include one or more heating elements configured to heat the pressed layers 56, thereby rendering the pressed layers 56 tacky. The tacky layers 56 then adhere to the previously printed layers of 3D part 18 during the pressing steps, and separate from transfer belt 20.

During a given pressing step, transfer belt 20 moves a given layer 56 to align with platen 16 and/or 3D part 18 with accurate registration along the horizontal x-axis. In coordination with a pause of transfer belt 20 in lower region 58b (via loop motors 74 and 84), z-axis motor 94 moves platen 16 upward along the vertical z-axis via z-axis gantry 92 until the top-most surface of 3D part 18 presses against the given layer 56. Transfusion plate 17 correspondingly prevents transfer belt 20 from bowing upward under the applied pressure. The applied pressure is desirably pressed at a level that provides suitable contact and adhesion between the given layer 56 and the top-most surface of 3D part 18, while also preventing 3D part 18 from being distorted under the applied pressure.

Proper transfer of layers 56 from transfer belt 20 to the top layer of 3D part 18 is dependent on multiple factors, such as the pressure between transfusion plate 17 and the top layer of 3D part 18 and/or platen 16, the temperature of the layer 56 being transferred (e.g., how tacky the material is), the contact duration between the transferred layer and the top layer of 3D part 18 (i.e., the duration of the pressing step), the adhesive properties of part material 54, the surface properties of belt 20 and transfusion plate 17, and the like.

In one embodiment, controller 30 operates with one or more feedback process control loops to monitor and adjust the height of platen 16 based on measured pressures between platen 16 and transfusion plate 17. In an additional embodiment, system 10 also operates with one or more feedback process control loops to monitor and adjust the temperature of transfusion plate 17 based on measured temperatures of layers 56. Examples of suitable techniques for such feedback process control loops, and a suitable transfusion technique for transferring the developer layers, are disclosed in co-filed U.S. Provisional patent application Ser. No. 61/538,491, and entitled "Layer Transfusion For Electrophotography-Based Additive Manufacturing".

When the pressing step is complete, z-axis motor 94 retracts platen 16 and 3D part 18 downward to separate the given layer 56 from transfer belt 20, such that the separated layer 56 is adhered to the top-most layer of 3D part 18. This process may then be repeated for each successive layer 56, where, for each successive pressing step, the upward pressing of platen 16 and 3D part 18 may be offset downward by an appropriate increment to maintain the proper level of applied pressure between platen 16 and transfusion plate 17 as 3D part 18 grows.

System 10 may also include cleaning station 96 between photoconductor drum 12 and service loop 28. Cleaning station 96 is a station configured to remove any residual, non-transferred portions of part material 54 from transfer belt 20 prior to receiving new layers 56. Suitable devices for cleaning station 96 include blade cleaners, brush cleaners, electrostatic cleaners, vacuum-based cleaners, and combinations thereof.

As shown, system 10 is suitable for printing 3D parts (e.g., 3D part 18) in a layer-by-layer manner with increased printing efficiency. Service loops 26 and 28 allow the successive layers 56 to be developed and transferred to transfer belt 20 at a constant rate, while also allowing the successive layers 56 to be pressed to top-most layers of 3D part 18 with pausing steps. Furthermore, service loops 26 and 28 may maintain the net rotational rate of the full rotations of transfer belt 20 at a substantially steady state.

Figure 3:
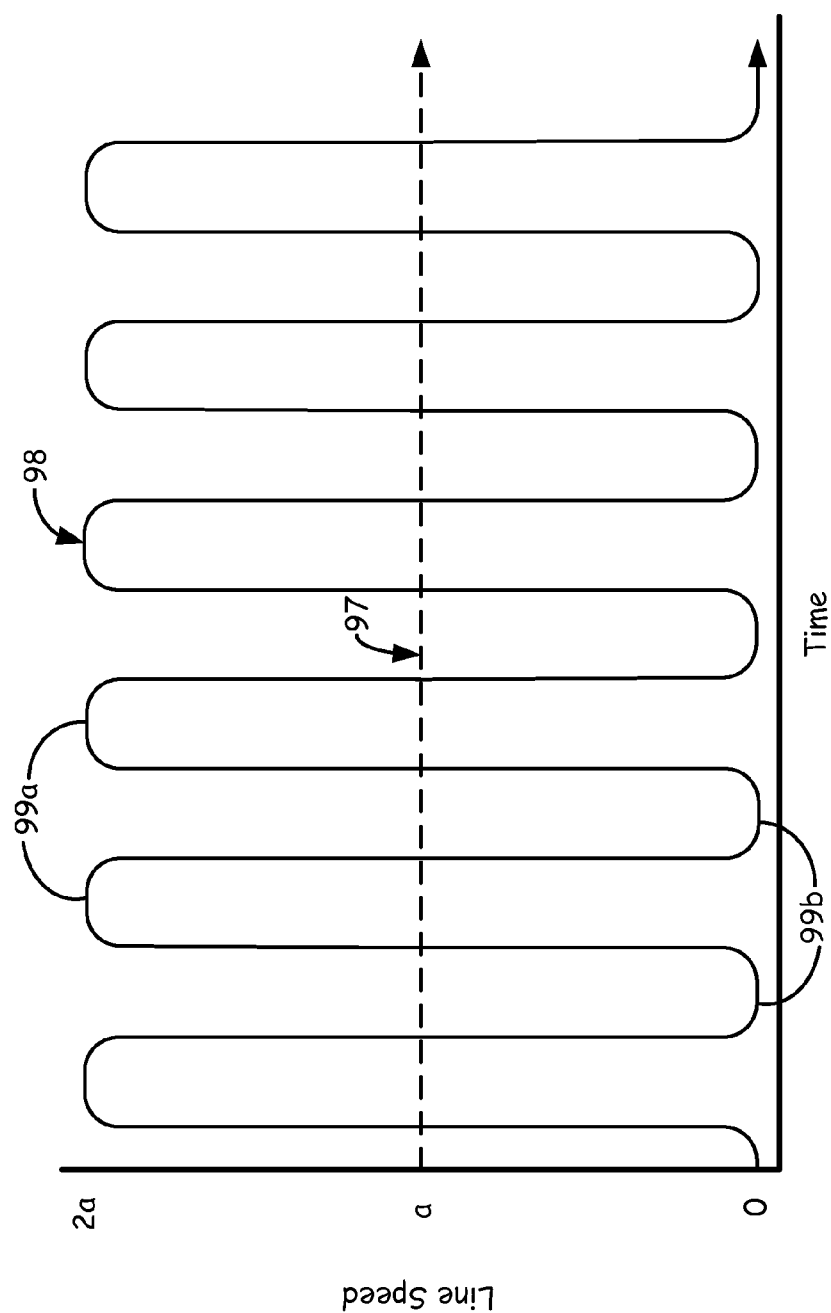
FIG. 3 is a plot of line speed versus time, illustrating different line speeds attainable with the service loops.

For example, as shown in FIG. 3, controller may operate loop motors 68, 74, 84, and 90 such that a first portion of transfer belt 20 moves through upper region 58a at first constant rate line speed 97 (shown as a broken line), and such that a second portion of transfer belt 20 moves through lower region 58b at second intermittent line speed 98 (shown as a solid line). First constant rate line speed 97 may be substantially constant at a line speed of "a", which desirably corresponds to the rotational rate of photoconductor drum 12 in the direction of arrow 42.

In comparison and by one example, second intermittent line speed 98 may exhibit a step effect with peaks 99a at a line speed of "2a" (i.e., two times the rate of "a") and valleys 99b at a line speed of zero. Valleys 99b are the pause points at which platen 16 is pressed against transfer belt 20 and transfusion plate 17 during the pressing steps. Between valleys 99b, service loops 26 and 28 move transfer belt 20 through lower region 58b in the rotational direction of arrows 57, where the maximum movement rates are attained at peaks 99a.

In the shown embodiment in which peaks 99a and valleys 99b encompass substantially the same time intervals, the resulting average line speed for transfer belt 20 in lower region 58b due to second intermittent line speed 98 is about "a", or about the same as first constant rate line speed 97. As such, as discussed above, service loops 26 and 28 may maintain the net rotational rate of the full rotations of transfer belt 20 at a substantially steady state.

The plot shown in FIG. 3 is a simplified illustration of the line speeds for transfer belt 20. However, it is understood that the particular drive signals to operate loop motors 68, 74, 84, and 90 may vary depending on particular process-control loop requirements. Furthermore, while peaks 99a and valleys 99b are illustrated as having the same time intervals, in alternative embodiments, peaks 99a and valleys 99b may exhibit different time intervals. For example, in a situation in which valleys 99b are twice as long as peaks 99a, second intermittent line speed 98 desirably has peaks 99a that are about three times the line speed of first constant rate line speed 97 (i.e., three times the rate of "a") to maintain the net rotational rate of the full rotations of transfer belt 20 at a substantially steady state.

As mentioned above, system 10 is suitable for printing 3D parts and support structures from part materials at high rates and with good part resolutions. In some embodiments, system 10 may print layers of 3D part 18 at a rate of at least about 40 layers per minutes (e.g., about 50 layers per minute) with accurate registrations, layer thicknesses ranging from about 5 micrometers to about 125 micrometers, and layer dimensions along the y-axis of at least 51 centimeters (about 11 inches). For example, system 10 may print 3D part 18 at a rate of about three inches in height along the vertical z-axis per hour.

The resolutions of the 3D parts may also be varied based on the printing rate. For example, 3D part 18 may be printed at a "high quality" resolution, in which system 10 operates at a slower rate, but prints with lower layer thicknesses. In this situation, first constant rate line speed 97 and second intermittent line speed 98 may be reduced to attain the "high quality" resolution.

Alternatively, 3D part 18 may be printed at a "draft quality" resolution, in which system 10 operates a faster rate, but prints greater layer thicknesses. In this situation, first constant rate line speed 97 and second intermittent line speed 98 may be increased to attain the "draft quality" resolution. Furthermore, 3D part 18 may be printed in "gray scale", in which a lower density of part material 42 is developed onto surface 24. Numerous resolutions and speeds therebetween may also be incorporated.

As discussed above, service loop 26 engages transfer belt 20 while transfer belt 20 retains successive layers 56. Thus, in one embodiment, inlet nip roller 60a and outlet nip roller 62a only engage the lateral edges of front surface 20a at inlet nip 64 and outlet nip 70, respectively. This prevents inlet nip roller 60a and outlet nip roller 62a from contacting the successive layers 56 that are retained on front surface 20a of transfer belt 20.

Figure 4A:
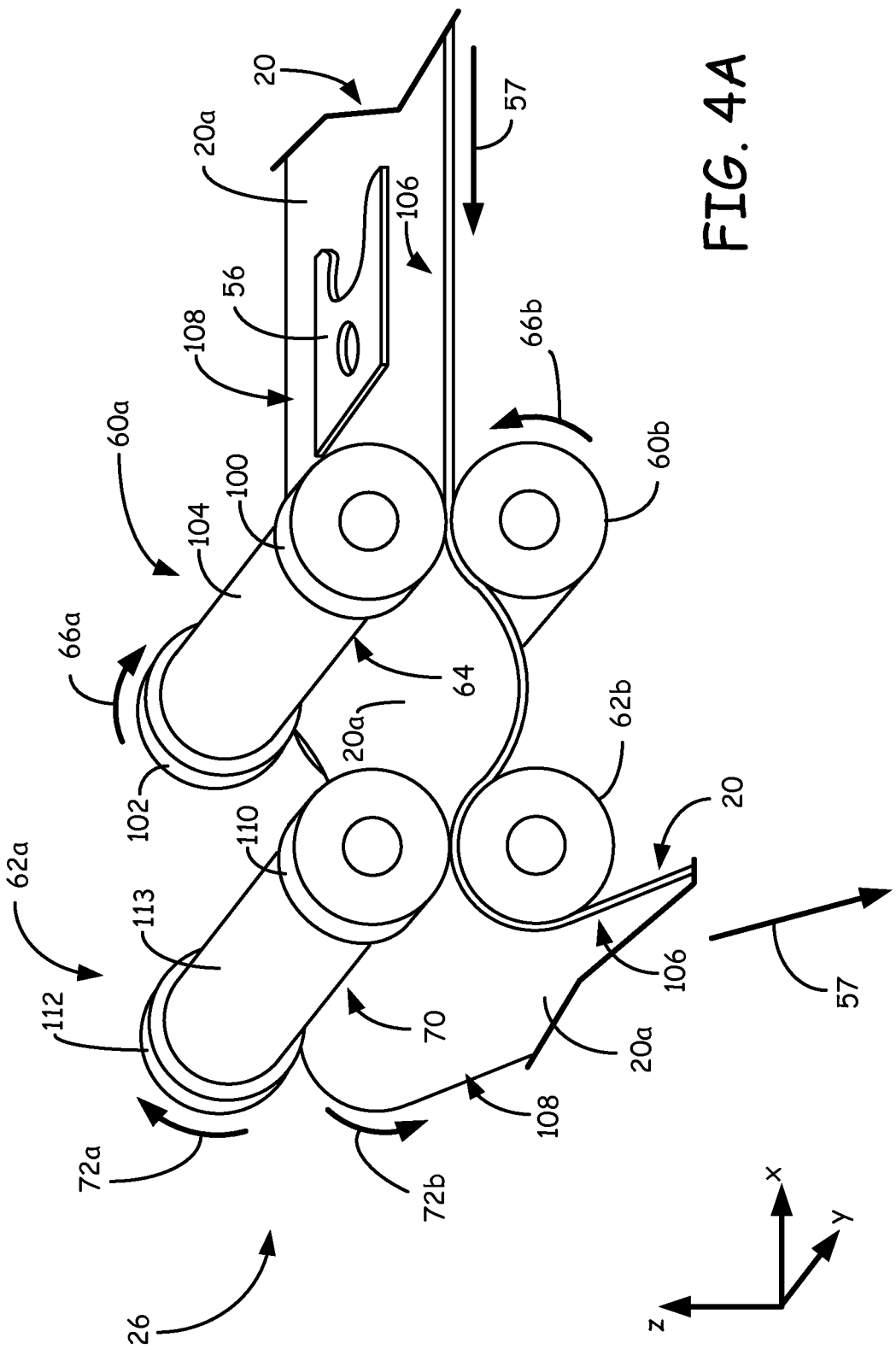
FIG. 4A is a schematic illustration of one of the service loops.

For example, as shown in FIG. 4A, inlet nip roller 60a may include lateral surfaces 100 and 102, which are opposing circumferential surfaces that are separated by indented surface 104 along the lateral y-axis. Lateral surfaces 100 and 102 are the portions of inlet nip roller 60a that contact the front surface 20a of transfer belt 20 at inlet nip 64. In particular, lateral surfaces 100 and 102 contact front surface 20a at lateral edges 106 and 108 of front surface 20a, where lateral edges 106 and 108 are portions of front surface 20a that are outside of the receiving region for layers 56.

Instead, the successive layers 56 pass under indented surface 104, where indented surface 104 is axially indented from lateral surfaces 100 and 102 by a distance that is greater than the thicknesses of layers 56. Examples of suitable axially indented distances of indented surface 104 relative to lateral surfaces 100 and 102 includes distances of at least about 5 micrometers, As such, inlet nip rollers 60a and 60b may grip and pull transfer belt 20 in the rotational direction of arrows 57 at the first constant rate line speed without contacting the successive layers 56.

Correspondingly, outlet nip roller 62a may include lateral surfaces 110 and 112, which are opposing circumferential surfaces that are separated by indented surface 113 along the lateral y-axis. Lateral surfaces 110 and 112 are the portions of inlet nip roller 62a that contact the front surface 20a of transfer belt 20 at outlet nip 70. In particular, lateral surfaces 110 and 112 contact front surface 20a at lateral edges 106 and 108.

Instead, the successive layers 56 pass under indented surface 113, where indented surface 113 is axially indented from lateral surfaces 110 and 112 by a distance that is greater than the thicknesses of layers 56. Examples of suitable axially indented distances of indented surface 113 relative to lateral surfaces 110 and 112 includes those discussed above for indented surface 104. As such, outlet nip rollers 62a and 62b may grip and pull transfer belt 20 in the rotational direction of arrows 57 at the second intermittent line speed (e.g., second intermittent line speed 98) without contacting the successive layers 56.

FIG. 4A illustrates one example of a suitable embodiment for driving transfer belt 20. In an alternative embodiment, lateral edges 106 and 108 of transfer belt 20 may each include an array of holes, and inlet nip roller 60a and outlet nip roller 62a may include reciprocating gear teeth engaged with the holes. This arrangement allows inlet nip roller 60a and outlet nip roller 62a to drive transfer belt 20 (along with inlet nip roller 60b and outlet nip roller 62b) in a tractor feed manner. In a further alternative embodiment, rear surface 20b of transfer belt 20 may include laterally extending ribs, and inlet nip roller 60b and outlet nip roller 62b may each include reciprocating gear teeth that engage with the laterally extending ribs. This arrangement allows inlet nip roller 60b and outlet nip roller 62b (along with inlet nip roller 60a and outlet nip roller 62a) to drive transfer belt 20 in a timing-belt manner.

Figure 4B:
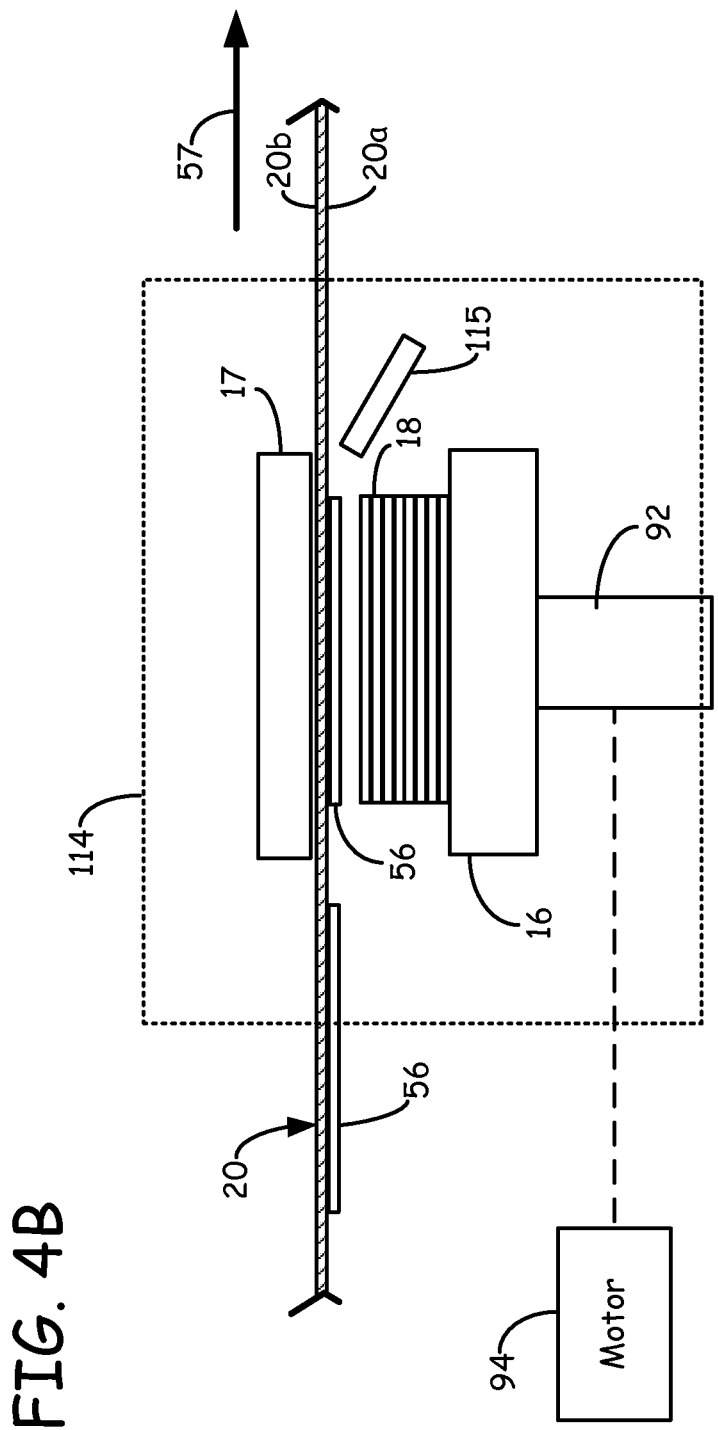
FIG. 4B is an expanded view of a transfer region between a transfer belt and platen, illustrating an embodiment with a heated chamber.

FIG. 4B illustrates an embodiment in which system 10 also includes heated chamber 114. As shown, heated chamber 114 extends around platen 16 and transfusion plate 17, and defines an enclosable environment for printing 3D part 18. In the shown example, heated chamber 114 partially encloses z-axis gantry 92 and transfer belt 20, allowing z-axis gantry 92 and transfer belt 20 to extend through the walls of heated chamber 114.

Heated chamber 114 is configured to be heated to, and maintained at, one or more temperatures that are in a window between the solidification temperature and the creep relaxation temperature of part material 54. This reduces the risk of mechanically distorting (e.g., curling) 3D part 18, where the creep relaxation temperature of part material 54 is proportional to the glass transition temperature of part material 54. Examples of suitable techniques for determining the creep relaxation temperatures of the part and support materials are disclosed in Batchelder et al., U.S. Pat. No. 5,866,058.

In one embodiment, system 10 may also include cooling unit 115. Cooling unit 115 is a gas jet (e.g., air jet) unit configured to blow localized air to the top layers of 3D part 18. Because system 10 is capable of printing layers 56 at high speeds (e.g., about 1.2 layers per second or greater), the tackified part material 54 for printed layers 56 does not have sufficient time to cool below the creep relaxation temperature before successive layers 56 are printed. As such, heat from the tackified part material 54 can build up in the printed layers 56, preventing them from cooling down to sufficient temperatures to vertically support the successive layers 56. Cooling unit 115 directs gas (e.g., air) to the top printed layer 56 of 3D part 18 to cool the top layer 56 down (e.g., to about the creep relaxation temperature of part material 54). This allows the cooled layer 56 to have sufficient strength to vertically support successively printed layers 56, while also reducing the risk of curling effects.

Figure 5:
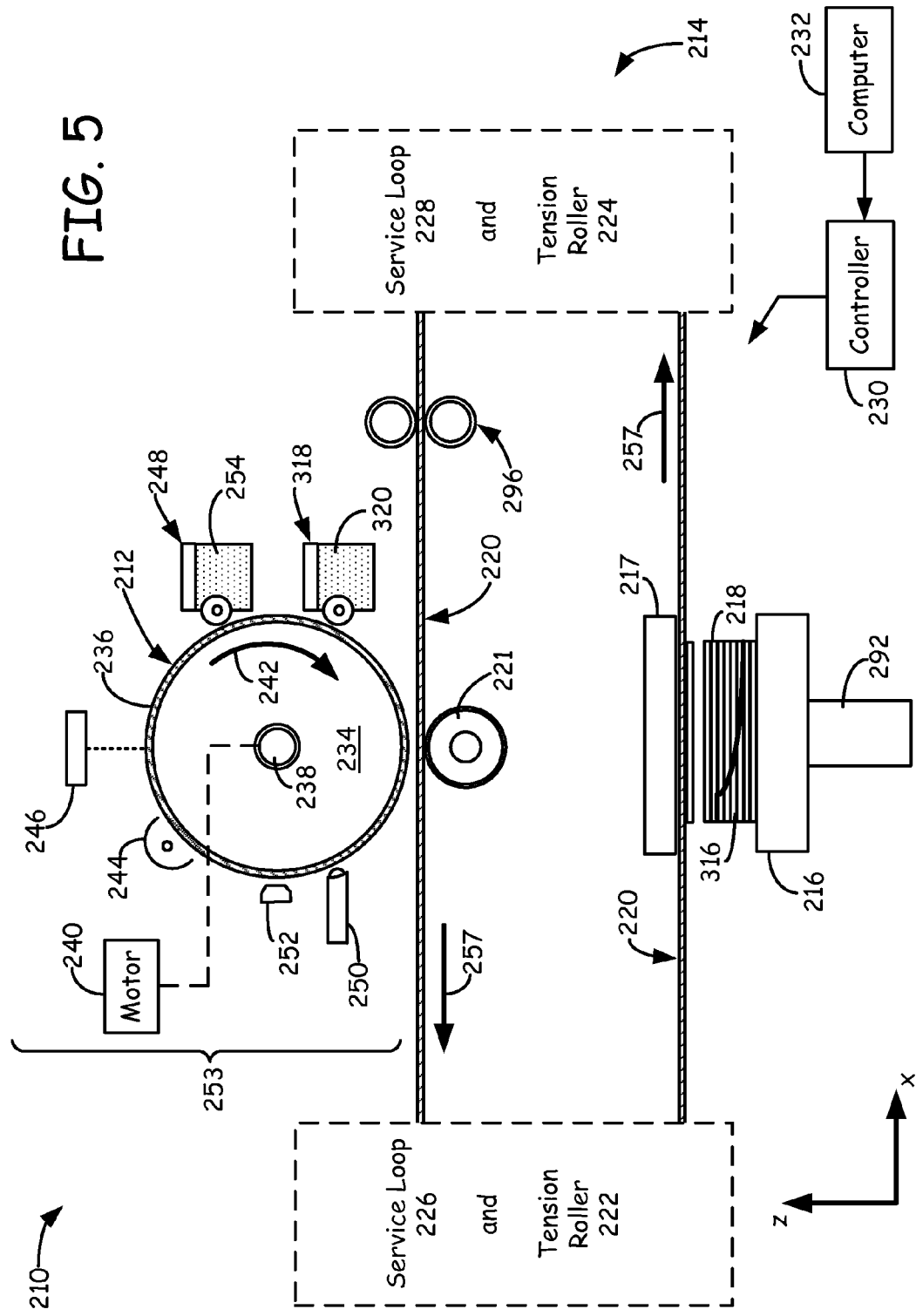
FIG. 5 is a schematic illustration of a first alternative additive manufacturing system of the present disclosure, which includes two development stations in use with a single photoconductor drum.
Figure 6:
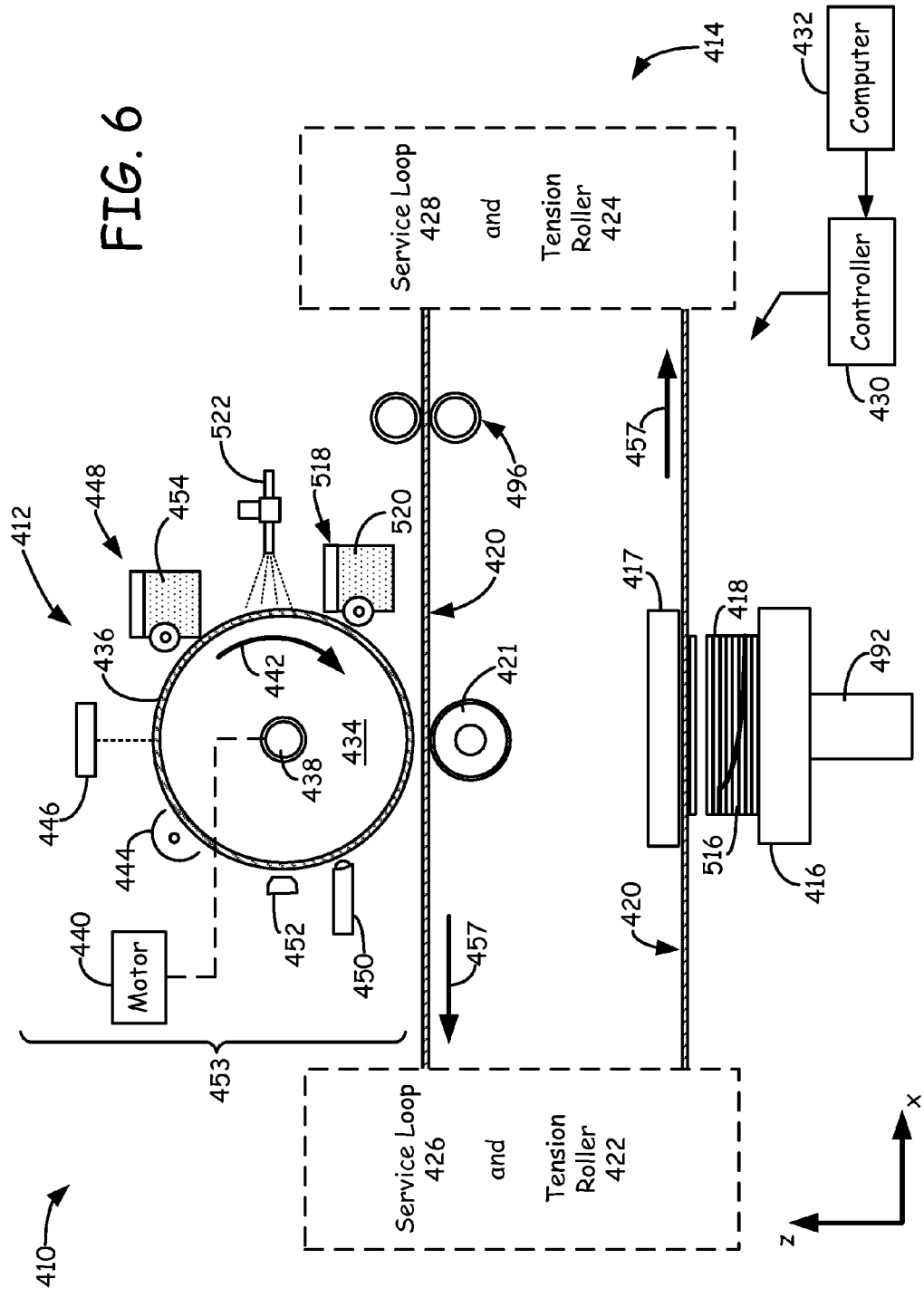
FIG. 6 is a schematic illustration of a second alternative additive manufacturing system of the present disclosure, which includes two development stations and two imagers in use with a single photoconductor drum.
Figure 7:
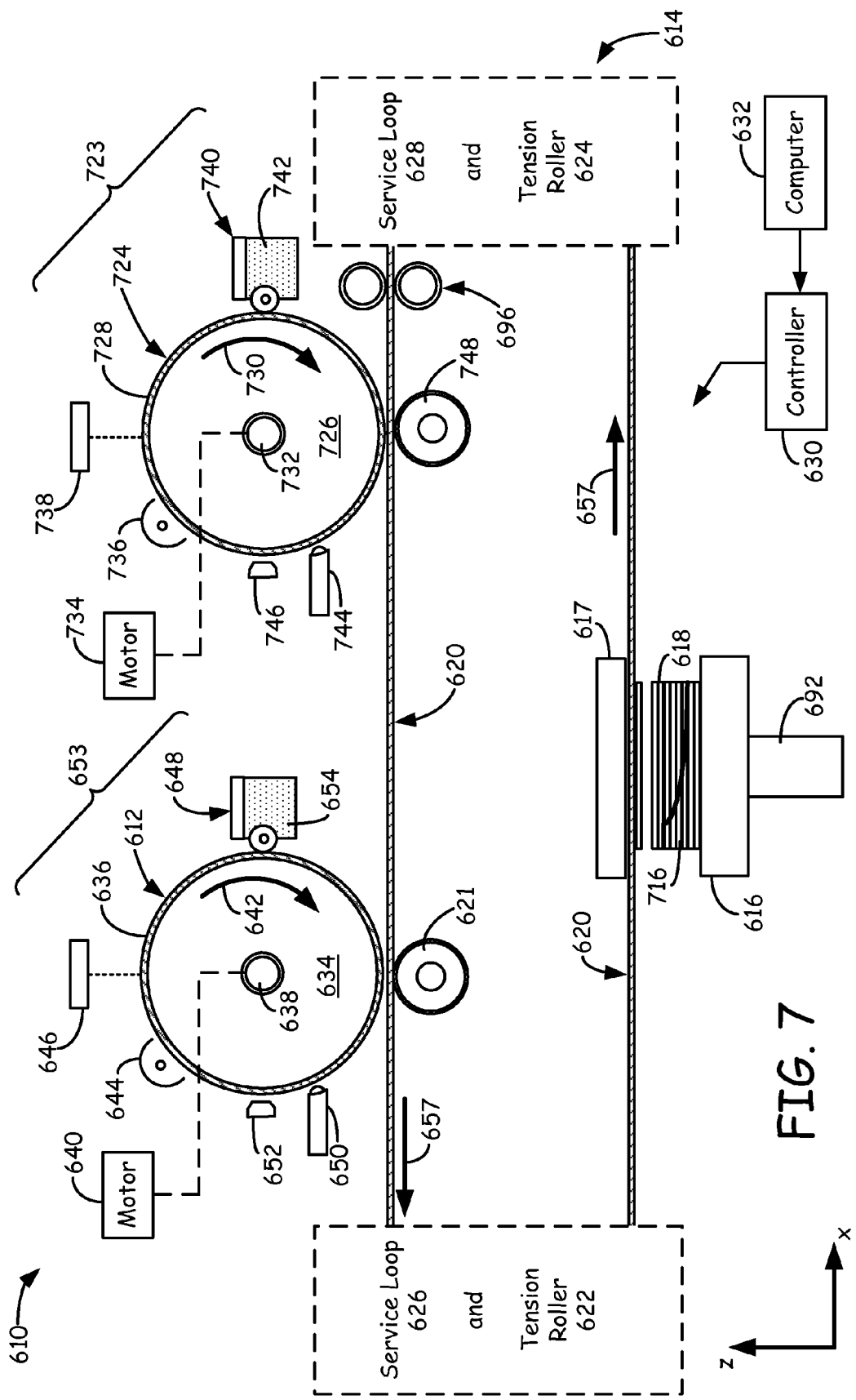
FIG. 7 is a schematic illustration of a third alternative additive manufacturing system of the present disclosure, which includes two photoconductor drums and image-forming components.

System 10 is illustrated as being configured to print 3D parts (e.g., 3D part 18) from a single part material (e.g., part material 54). However, the additive manufacturing systems of the present disclosure may also be configured to print 3D parts and/or support structures from multiple part materials and/or support materials (e.g., multiple compositions and/or colors). FIGS. 5-7 illustrate suitable alternative embodiments for system 10 that incorporate multiple materials, where the service loops of the alternative systems may function in the same manner as service loops 26 and 28 for moving different portions of the rotatable transfer media (e.g., transfer belts) at different rates (e.g., a first constant rate line speed and a second intermittent line speed).

FIG. 5 illustrates system 210, which is similar to system 10 for printing 3D part 218 and support structure 316 in a layer-by-layer manner using electrophotography, where reference numbers are increased by "200" from those of system 10. Support structure 316 may provide vertical support along the z-axis for overhanging regions of any of the layers of 3D part 218. As shown, EP engine 253 of system 210 includes development station 248, which corresponds to development station 48 of system 10. EP engine 253 also includes development station 318, which is located adjacent to development station 248. Suitable devices for development station 318 include those discussed above for development station 48.

In this embodiment, development station 318 allows system 210 to print 3D part 218 and support structure 316 from separate materials. For example, development station 318 may include support material 320 for printing support structure 316 in a layer-by-layer manner. Alternatively, development stations 248 and 318 may each include part materials 254 and 320 having different compositions or colors, where system 210 may selectively form layers of 3D part 218 with one or both of part materials 254 and 320.

During operation, while rotating photoconductor drum 212 in the direction of arrow 242, controller 230 may transfer part material 248 or support material 320 by selectively engaging either development station 248 or development station 318 with surface 236, thereby attracting the respective materials from the engaged development station. Thus, alternating layers of part material 254 and support material 320 may be developed and transferred to platen 216 for printing 3D part 218 and support structure 316.

The dual-material arrangement of system 310 typically restricts its operational speed to about half the speed of system 10. In comparison, the embodiments shown in FIGS. 6 and 7 illustrate suitable systems for faster printing. FIG. 6 illustrates system 410, which is similar to system 210 for printing 3D part 418 and support structure 516 in a layer-by-layer manner using electrophotography, where reference numbers are increased by "400" from those of system 10, and by "200" form those of system 210. As shown, EP engine 453 of system 410 also includes imager 522, which is a second imager that is also configured to create charged-latent images on surface 436 of photoconductor drum 412. Therefore, imager 446 may be used to create the charged latent images for developing layers of 3D part 418 using part material 454, and second imager 522 may be used to create the charged latent images for developing layers of support structure 516 using support material 520.

In this embodiment, the use of dual imagers 446 and 522 allow a layer of support material 520 to be developed along with a layer of part material 454, thereby providing a combined layer of part material 454 and support material 520 to be transferred from photoconductor drum 412 to transfer belt 420. During operation, part material 454 and support material 520 may be developed using same the electrostatic polarities to produce a single layer on surface 436, where the single layer contains two images in functional-complementary areas of surface 436. Because the given layer of part material 454 and support material 520 are developed within a single area of surface 436, with each controlled to its complementary portion of that area, the single layer can be followed by a next developed layer with only a small inter-layer gap between them. As such, system 410 may print 3D part 418 and support structure 520 at the same printing rate as a single-material system, and at about double the rate of system 310 (shown in FIG. 5).

FIG. 7 illustrates system 610, which is similar to system 10 for printing 3D part 618 and support structure 716 in a layer-by-layer manner using electrophotography, where reference numbers are increased by "600" from those of system 10. As shown, system 610 includes EP engine 653 (i.e., photoconductor drum 612 and photoconductive surface 636, charge inducer 644, imager 646, development station 648, cleaning station 650, discharge device 652, shaft 638, and drive motor 640), which may operate in the same manner as EP engine 53 of system 10 for developing layers of part material 654.

System 610 also includes EP engine 723 having photoconductor drum 724 (with conductive drum 726 and photoconductive surface 728), which rotates in the direction of arrow 730 under the power of drive shaft 732 and drive motor 734, based on commands from controller 630. Developer engine 723 further includes charge inducer 736, imager 738, development station 740 (retaining support material 742), cleaning station 744, and discharge device 746, each of which may be in signal communication with controller 630. System 610 also includes biased roller 748, which may operate in the same manner as biased roller 621 to apply an electrical potential to transfer belt 620 adjacent to photoconductor drum 724.

EP engine 723 may operate in the same manner as EP engine 653 for developing layers of support material 742. Controller 630 desirably rotates photoconductor drums 612 and 724 at the same rotational rates that are synchronized with the first constant rate line speed of transfer belt 610. This allows system 610 to develop and transfer layers of part material 654 and support material 742 in coordination with each other from separate developer images.

In this embodiment, the layers of part material 654 and support material 742 may be transferred to transfer belt 620 in a selective manner. In particular, while transfer belt 610 is rotated in the rotational direction of arrows 657, the layers of part material 654 transferred from photoconductor drum 612 are desirably not transferred on top of the previously transferred layers of support material 742.

System 610 may provide the same printing rates with two different materials as system 410 (shown in FIG. 6) with the use of separate EP engines. In an alternative embodiment, each EP engine of system 610 may also include multiple development stations in the same manner as discussed above for system 210 and/or system 410. Additionally, system 610 may also include three or more EP engines to develop layers of additional materials and/or colorants for 3D part 618 and/or support structure 716.

The additive manufacturing systems of the present disclosure are efficient mechanisms for printing 3D parts and/or support structures using electrophotography, where the 3D parts and/or support structures may be printed from one or more compositions and colorants. For example, the systems may include additional development stations with different colorants that may diffuse into the developed layers of the part materials and/or support materials. In these embodiments, the additional development stations may apply colors to the part and/or support materials using one or more color creation techniques, such as selective spot colors, subtractive color creation using cyan, yellow, magenta, and black materials, and/or additive color creation (e.g., partitive color creation) using cyan, yellow, magenta, red, green, blue, and black materials.

The use of the service loops allow different portions of the rotatable transfer medium (e.g., a transfer belt) to operate at different line speeds, while maintaining a net rotational rate of the full rotations of the rotatable transfer medium at a substantially steady state. This increases the printing efficiency of the system, thereby reducing operating times while printing 3D parts and support structures.

The terms "about" and "substantially" are used herein with respect to measurable values and ranges due to expected variations known to those skilled in the art (e.g., limitations and variabilities in measurements). All temperatures referred to herein are based on atmospheric pressure (i.e. one atmosphere).

Although the present disclosure has been described with reference to preferred embodiments, workers skilled in the art will recognize that changes may be made in form and detail without departing from the spirit and scope of the disclosure.

The invention claimed is:

1. An additive manufacturing system for printing a three-dimensional part, the additive manufacturing system comprising:
   a development engine configured to develop layers from one or more materials;
   a transfer medium configured to move in a rotating manner, and to receive the developed layers from the development engine;
   a platform assembly configured to receive the developed layers from the transfer medium in a layer-by-layer manner to print the three-dimensional part from the layers received from the transfer medium;

a first mechanism having one or more motor-operated rollers, wherein the first mechanism is engaged with the transfer medium at a first location that is downstream from the development engine and upstream from the platform assembly; and a second mechanism having one or more motor-operated rollers, wherein the second mechanism is engaged with the transfer medium at a second location that is downstream from the platform assembly and upstream from the development engine;

wherein the first mechanism and the second mechanism maintain tension on the transfer medium such that the transfer medium rotates past the development engine at a substantially steady line speed while the platform assembly receives the developed layers from the transfer medium.

2. The additive manufacturing system of claim 1, and further comprising one or more tension rollers that also maintain tension on the transfer medium.

3. The additive manufacturing system of claim 1, wherein the development engine comprises a drum configured to rotate at a first rotational rate, and wherein the substantially steady line speed of the transfer medium is synchronized with the first rotational rate of the drum.

4. The additive manufacturing system of claim 1, and further comprising a transfusion element configured to operate with the platform assembly to transfer the developed layers from the transfer medium to the platform assembly.

5. The additive manufacturing system of claim 1, wherein the transfer medium comprises a belt.

6. The additive manufacturing system of claim 1, wherein at least one of the first mechanism and the second mechanism is configured to drive the transfer medium the rotating manner.

7. The additive manufacturing system of claim 1, and further comprising a chamber at least partially enclosing the platform assembly and at least a portion of the transfer medium, wherein the chamber is configured to be heated to one or more temperatures.

8. An additive manufacturing system for printing a three-dimensional part and a support structure, the additive manufacturing system comprising:

a plurality of development engines configured to develop layers from multiple materials;

a transfer medium configured to move in a rotating manner, and to receive the developed layers from the plurality of development engines;

a platform assembly configured to receive the developed layers from the transfer medium in a layer-by-layer manner to print the three-dimensional part and the support structure from the layers received from the transfer medium;

a first mechanism having one or more motor-operated rollers, wherein the first mechanism is engaged with the transfer medium at a first location that is downstream from the plurality of development engines and upstream from the platform assembly; and a second mechanism having one or more motor-operated rollers, wherein the second mechanism is engaged with the transfer medium at a second location that is downstream from the platform assembly and upstream from the plurality of development engines;

wherein the first mechanism and the second mechanism maintain tension on the transfer medium such that the transfer medium rotates past the plurality of development engines at a substantially steady line speed while the platform assembly receives the developed layers from the transfer medium.

9. The additive manufacturing system of claim 8, and further comprising one or more tension rollers that also maintain tension on the transfer medium.

10. The additive manufacturing system of claim 8, wherein the plurality of development engines are configured to develop layers of the materials with electrostatic charges.

11. The additive manufacturing system of claim 8, wherein the plurality of development engines comprise a drum configured to rotate at a first rotational rate, and wherein the substantially steady line speed of the transfer medium is synchronized with the first rotational rate of the drum.

12. The additive manufacturing system of claim 8, wherein at least one of the first mechanism and the second mechanism is configured to drive the transfer medium the rotating manner.

13. The additive manufacturing system of claim 8, wherein the transfer medium comprises a belt.

14. An additive manufacturing system for printing a three-dimensional part, the additive manufacturing system comprising:

a belt configured to move in a rotational direction, and to receive layers at a first transfer region;

a platform assembly located at a second transfer region;

a transfusion element located at the second transfer region, and configured to engage the belt to transfer the layers from the belt to the platform assembly in a layer-by-layer manner to print at least a portion of the three-dimensional part;

a first mechanism engaged with the belt between the first transfer region and the second transfer region based on the rotational direction of the belt; and a second mechanism engaged with the belt at a second location between the second transfer region and the first transfer region based on the rotational direction of the belt;

wherein the first mechanism and the second mechanism maintain tension on the belt such that the belt moves across the first transfer region at a substantially steady line speed while the transfusion element engages the belt at the second transfer region to transfer the layers from the belt to the platform assembly.

15. The additive manufacturing system of claim 14, and further comprising one or more tension rollers that also maintain tension on the belt.

16. The additive manufacturing system of claim 14, and further comprising a development engine configured to develop the layers, wherein the belt is configured to receive the layers at the first transfer region from the development engine.

17. The additive manufacturing system of claim 16, wherein the development engine is configured to electrostatically develop the layers.

18. The additive manufacturing system of claim 14, wherein the first mechanism and the second mechanism each comprise one or more motor-operated rollers.

19. The additive manufacturing system of claim 14, wherein at least one of the first mechanism and the second mechanism is configured to drive the belt in the rotational direction.

20. The additive manufacturing system of claim 14, and further comprising a cleaning station located between the second transfer region and the first transfer region based on the rotational direction of the belt.

* * * * *